(12) United States Patent
Hauttmann et al.

(10) Patent No.: US 7,911,170 B2
(45) Date of Patent: Mar. 22, 2011

(54) SENSORLESS MEASUREMENT OF THE ROTATION FREQUENCY OF A ROTOR OF AN ASYNCHRONOUS MACHINE

(75) Inventors: Stefan Hauttmann, Buchholz (DE); Silvana Arsova, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 461 days.

(21) Appl. No.: 11/916,554

(22) PCT Filed: Jun. 6, 2006

(86) PCT No.: PCT/IB2006/051791
§ 371 (c)(1),
(2), (4) Date: Sep. 23, 2008

(87) PCT Pub. No.: WO2006/131878
PCT Pub. Date: Dec. 14, 2006

(65) Prior Publication Data
US 2009/0140681 A1   Jun. 4, 2009

(30) Foreign Application Priority Data
Jun. 9, 2005  (EP) ..................... 05105069

(51) Int. Cl.
*H02P 21/14* (2006.01)
(52) U.S. Cl. ........ 318/490; 318/781; 318/802; 318/807; 363/39
(58) Field of Classification Search .................. 318/490, 318/781, 802, 807; 363/39, 41
See application file for complete search history.

(56) References Cited

U.S. PATENT DOCUMENTS
5,565,752 A * 10/1996 Jansen et al. .................. 318/807
(Continued)

FOREIGN PATENT DOCUMENTS
DE   2921724 C2   12/1980
DE   19823787 A1  12/1999

OTHER PUBLICATIONS

Hurst et al: "A Comparison of Spectrum Estimation Techniques For Sensorless Speed Detection in Induction Machines"; IEEE Transaction of Industry Applications, vol., No. 4, Jul./Aug. 1997, Whole Document, XP011022233.

(Continued)

*Primary Examiner* — Paul Ip

(57) ABSTRACT

The present invention relates to a device (20) and a method for sensorless measuring a mechanical rotor frequency of a rotor (6) of an asynchronous machine (40), wherein the rotor (6) has a predetermined defect and the asynchronous machine (40) has a fixed number of pairs of poles. The asynchronous machine (40) comprises a current determination unit (2) for determining a stator current of the stator (7), wherein the stator current has a stator frequency. A processing unit (3) forms a stator current spectrum of the stator current. An analyzing unit (4) analyzes the stator current spectrum and determines an inverse peak (26) and a corresponding inverse frequency in the stator current spectrum, wherein the inverse peak (26) is the peak having the second highest amplitude in the stator current spectrum in the frequency range of the stator frequency. A calculation unit (5) calculates a mechanical rotor frequency of the rotor (6) from the sum of the stator frequency divided by the number of pairs of poles and the inverse frequency, if the slip of the asynchronous machine (40) is lower than 50%, or from the difference of the stator frequency divided by the number of pairs of poles and the inverse frequency, if the slip is higher than 50%.

14 Claims, 3 Drawing Sheets

U.S. PATENT DOCUMENTS

Figure 1:
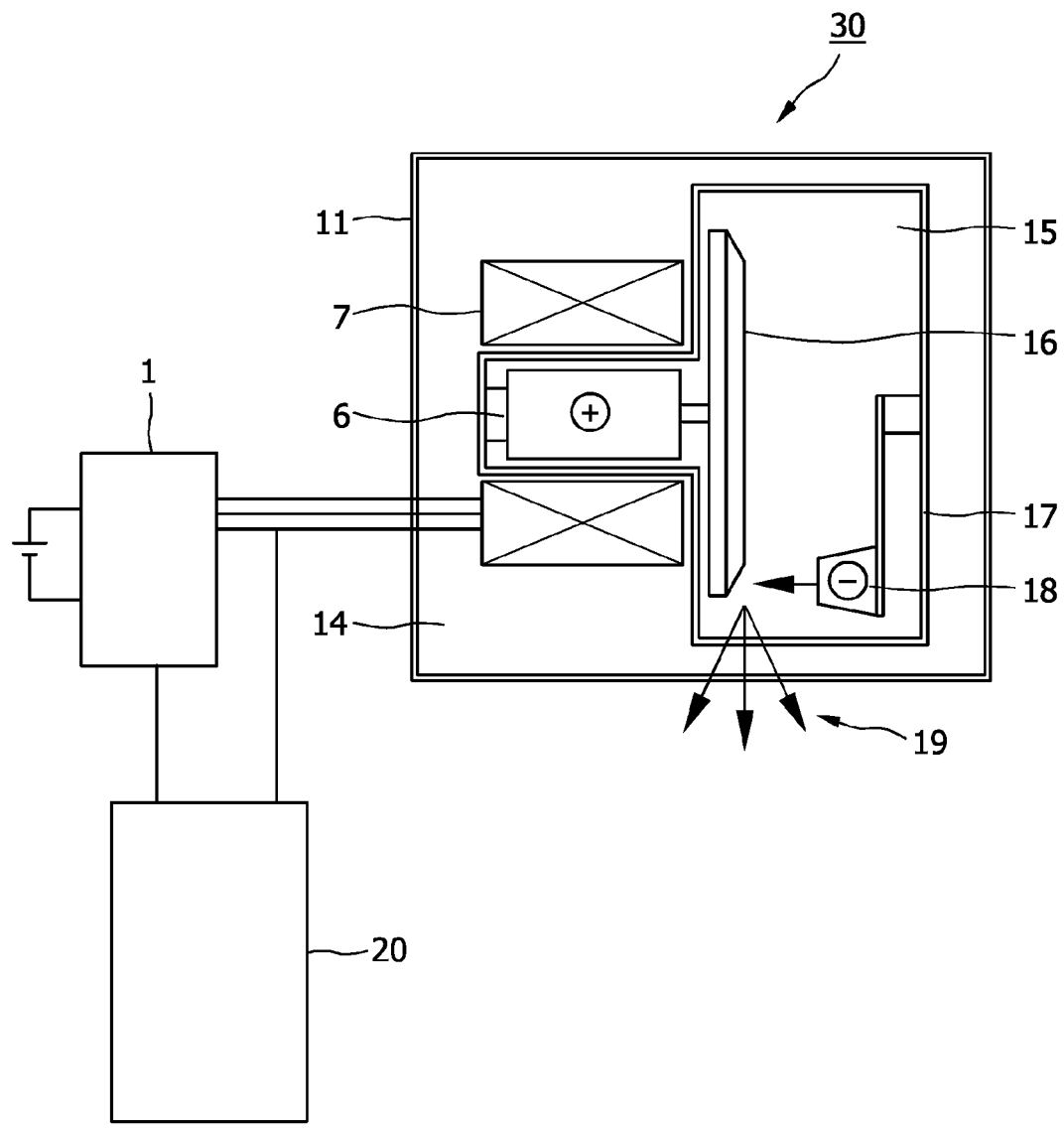

| | | | |
|---|---|---|---|
| 5,828,210 A | 10/1998 | Kliman et al. | |
| 5,883,487 A * | 3/1999 | Rosenzweig et al. | 318/781 |
| 6,058,596 A | 5/2000 | Jansen et al. | |
| 6,208,132 B1 * | 3/2001 | Kliman et al. | 324/177 |
| 6,232,692 B1 | 5/2001 | Kliman | |
| 7,746,039 B2 * | 6/2010 | Hoffmann et al. | 322/89 |
| 2004/0054485 A1 | 3/2004 | Dragomir-Daescu et al. | |
| 2008/0136380 A1 * | 6/2008 | Hoffmann et al. | 322/29 |
| 2008/0174195 A1 * | 7/2008 | Tupper et al. | 310/179 |
| 2008/0291705 A1 * | 11/2008 | Alacoque | 363/39 |
| 2010/0027302 A1 * | 2/2010 | Bauer et al. | 363/41 |
| 2010/0052626 A1 * | 3/2010 | Tupper et al. | 322/61 |
| 2010/0079104 A1 * | 4/2010 | Becker et al. | 318/802 |

OTHER PUBLICATIONS

Jansen et al: "Transducerless Position and Velocity Estimation in Induction and Salient AC Machines"; Industry Applications Society Annual Meeting, 1994, Denver, CO., Oct. 2-6, 1994, IEEE, pp. 488-495, XP010124039.

* cited by examiner

SENSORLESS MEASUREMENT OF THE ROTATION FREQUENCY OF A ROTOR OF AN ASYNCHRONOUS MACHINE

The invention relates to an asynchronous machine including a rotor and a stator and having a fixed number of pairs of poles, said rotor having a predetermined defect, which asynchronous machine comprises means for determining the mechanical rotor frequency. The invention also relates to a device and a method for determining a mechanical rotor frequency of a rotor of an asynchronous machine, wherein said asynchronous machine has a fixed number of pairs of poles and a stator, wherein said rotor has a predetermined defect. The invention is preferably applied in an X-ray tube having a rotary anode for measuring the mechanical rotor frequency of said rotary anode.

The rotation frequency of a rotary anode, which is usually driven by a rotor of an asynchronous machine, in X-ray tubes is one of the key parameters for a controlled operation. This is one of the parameters, which limits the power of the tube. Until now in most tubes the rotation frequency and velocity was approximated. This results in working with not adapted power, which may cause destruction of the rotary anode. Knowledge of the rotation frequency in the X-ray tubes provide save operation with highest power without rotary anode destruction and provides the opportunity of a boost mode drive for directly cooled high power tubes with spiral groove bearing. The bearing can be run controlled at different frequencies adapted to the required focal spot power and the bearing friction losses during waiting time in the application.

Since the rotor is located inside the vacuum of the X-ray tube it is not accessible—neither mechanically nor optically—in the case of high power metal ceramics tubes. A measurement of the rotation frequency by means of internal or external sensors is complex and afflicted with strong side effects e.g. due to the thermal and high voltage conditions within the X-ray tube. The only parameter accessible from outside is the current of the stator.

In case of an asynchronous machine it is possible to identify the rotor frequency by measuring the magnetic leakage flux of the rotor. All known methods (U.S. Pat. No. 6,208,132 B1; U.S. Pat. No. 5,828,210; DE 2921724 C2) use additional sensor coils to measure this leakage flux. These coils have to be shielded or combined with compensating coils in a complex way to achieve an analyzable signal.

U.S. Pat. No. 5,565,752 discloses a method and apparatus for transducerless position and velocity estimation in drives for AC machines. The rotor has saliencies which result in a change in impedance as seen at the stator windings to the high frequency excitation signal as a periodic function of rotor rotational position. A further signal for the estimation of the rotor frequency is launched to the system. The linear controller forces convergence of the estimated rotor position on the actual position and therewith an estimated rotor frequency.

DE 198 23 787 A1 discloses a method for an early detection of defects in asynchronous motors with a squirrel cage rotor. It is further known from this document that a rotor defect induces a magnetic field in the air gap between rotor and stator which is inverse to the magnetic field of the stator. As input for the analyzing method to detect defects the mechanical rotor frequency, which is a measure for the rotary velocity of the rotor, has to be known and is measured optically or mechanically. The amplitude of the stator current signal, which is measured during the operational mode of the asynchronous machine, indicates the largeness of the rotor defect.

Another method is given by the field-oriented control of asynchronous motor, which includes the calculation of the mechanical rotor frequency.

The known methods for measuring the rotor frequency suffer from the high effort of reducing interfering signals because of the small amplitude of the measured leakage flux. Additionally, only the slip frequency is measured which may be small and close to zero and thus not very accurate. The methods may only be accurate, if the temperature of the motor is constant and well known.

It is an object of the invention to provide a solution for a measurement of the mechanical rotor frequency of the rotor in an asynchronous machine without using additional sensors for measuring said mechanical rotor frequency.

The object is achieved according to the present invention by an asynchronous machine as claimed in claim 1 comprising a current determination unit for determining a stator current of said stator, said stator current having a stator frequency, a processing unit for forming a stator current spectrum of said stator current, an analyzing unit for analyzing said stator current spectrum and determining an inverse peak and a corresponding inverse frequency in said stator current spectrum, said inverse peak being the peak having the second highest amplitude in said stator current spectrum in the frequency range of said stator frequency, and a calculation unit for calculating a mechanical rotor frequency of said rotor from the sum of said stator frequency divided by the number of pairs of poles and said inverse frequency, if the slip of said asynchronous machine is lower than 50%, or from the difference of said stator frequency divided by the number of pairs of poles and said inverse frequency, if said slip is higher than 50%.

The object is also achieved by a device and a method for determining a mechanical rotor frequency of a rotor of an asynchronous machine as defined in claims 13 and 14.

To detect the mechanical rotor frequency $f_r$ in an asynchronous machine, which has a fixed number of pairs of poles, a predetermined defect is generated in the rotor in a way that the rotor shows an asymmetric behavior for the magnetic field but is mechanically balanced. The predetermined defect of the rotor constitutes the signal generator for the rotation frequency measurement. This defect has to be large enough to produce a clear peak in the stator current spectrum, but has to be sufficiently small as well to assure that no significant influence to the machine properties like the efficiency occurs.

The number of pairs of poles of an asynchronous machine is usually an even number. The magnetic field of the stator rotates with the stator frequency divided by the number of pairs of poles, i.e. with $$\frac{f_s}{p}$$

(p being the number of pairs of poles), then the defect induces an inverse component of the magnetic field in the air gap, which induces a current component in the stator coils with an inverse frequency. The spectral analysis of the measured stator currents reveals the inverse frequency, from which the mechanical rotor frequency can be calculated using the slip dependency of the asynchronous machine. During normal operational mode of an asynchronous machine the slip is lower than 50%. Only in exceptional cases an asynchronous machine having a slip higher than 50% is employed. In practice, this method leads to an accuracy of Δf=0.1 Hz in evaluating the mechanical rotor frequency. It is applicable in all asynchronous machines with a massive rotor.

The method according to the invention requires no additional sensor coils, only the stator current is required and analyzed, which is preferably measured by a current sensor. Consequently, no shields or compensations are necessary. The present invention only uses the stator current spectrum as an input, derives from this spectrum the inverse frequency and calculates the mechanical rotor frequency from the stator frequency divided by the number of pairs of poles and the inverse frequency. Therefore, an exact calculation based on the simple dependency of the three frequencies is achieved. Additionally, the mechanical rotor velocity can be easily calculated from the mechanical rotor frequency. The inverse frequency is measured directly in a frequency range, which is well analyzable. The frequency range is a predetermined range with frequencies lower than the stator frequency divided by the number of pairs of poles. A further advantage of the invention is that the frequency does not depend on the temperature. The measurement can be carried out simultaneously and at any time during the operational mode of the asynchronous machine.

To obtain an optimal result of the calculation the calculation unit is preferably adapted for dividing the obtained sum or difference, respectively, by two. This relationship between the fixed number of pairs of poles p, the stator frequency $f_s$ and the inverse frequency $f_{rp}$, which are induced in the magnetic field in the air gap between rotor and stator, and the mechanical rotor frequency $f_r$ of the rotor is derived from the equation $$f_{rp} = \left| 2f_r - \frac{f_s}{p} \right|.$$

The factor two provides an exact calculation of the mechanical rotor frequency. An exact value of the mechanical rotor frequency simplifies an optimal adjustment of the mechanical rotor frequency, which can be easily calculated from the mechanical rotor frequency, to an optimal operational mode.

The current determination unit is preferably adapted to measure the stator current of the stator. By measuring the stator current also the stator frequency and the stator peak having the highest amplitude in the stator current spectrum is determined. This simplifies the peak determination process for determining the inverse frequency and the inverse peak having the second highest amplitude in the stator current spectrum.

If the asynchronous machine should be adapted to an operational mode with a specified mechanical rotor frequency, a control unit for controlling said stator current of said stator is preferably used. The control unit preferably accelerates or decelerates the rotor depending on the calculation result. The device and asynchronous machine according to the invention provide simple means to control the mechanical rotor frequency during the operational mode.

In another advantageous embodiment of the invention said analyzing unit is adapted for determining a stator peak and a corresponding stator frequency in the stator current spectrum. The stator peak is the peak having the highest amplitude in the stator current spectrum and the stator frequency is higher than the inverse frequency. By determining the stator peak and the stator frequency in the stator current spectrum the exactness of the calculation is further increased.

The analyzing unit is further preferably adapted for determining, if the amplitude, the frequency and/or the width of peaks in the stator current spectrum are within specified ranges. This simplifies the process of the peak determination and leads to precise and reliable calculation results.

Preferably, the analyzing unit determines the inverse peak by limiting the frequency range of said stator frequency in the stator current spectrum. The frequency range generally includes all frequencies being lower than the stator frequency divided by the number of pairs of poles. This range can be further limited to all frequencies higher than the sweep frequency of the asynchronous machine (which is lower than the stator frequency divided by the number of pairs of poles and which is known in advance). By limiting the frequency range the exactness of the calculation results is further increased.

The rotor is preferably a massive rotor, which is a full or hole iron made cylinder, with or without a copper cylinder. Several embodiments of the predetermined defect in the rotor are possible, for example a hole or a pair of oppositely arranged holes in the rotor. Also an inhomogeneity in the rotor, in particular a variation of the thickness of the shell of the rotor or of the material of the rotor, is advantageously provided as the predetermined defects generating the signal of the inverse peak in the stator current spectrum. Thereby the predetermined defects should constitute 0.5% to 5%, in particular 1% to 3.5%, of the shell of said rotor to generate a precise signal without influencing the mechanical properties of the rotor.

The asynchronous machine according to the invention is preferably included in an X-ray tube for driving a rotary anode coupled to the rotor. By determining the mechanical rotor frequency the frequency of the rotary anode is advantageously adapted to an optimal operational mode. Thus, the quality of the X-ray measurements is increased and the durableness of the rotary anode is extended.

Figure 2:
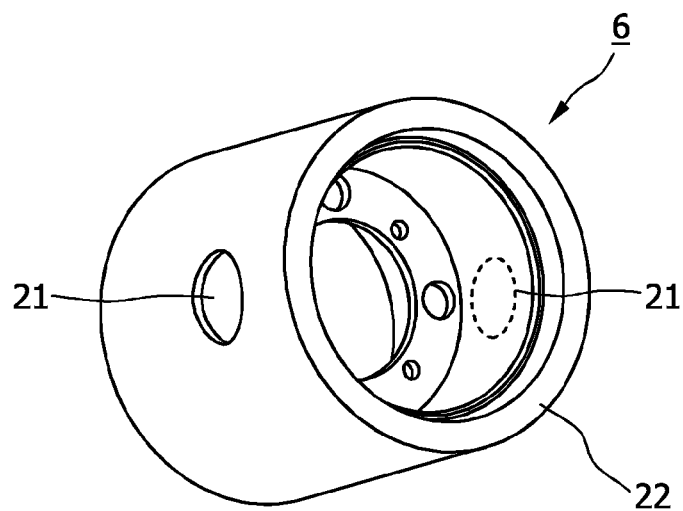
Figure 3:
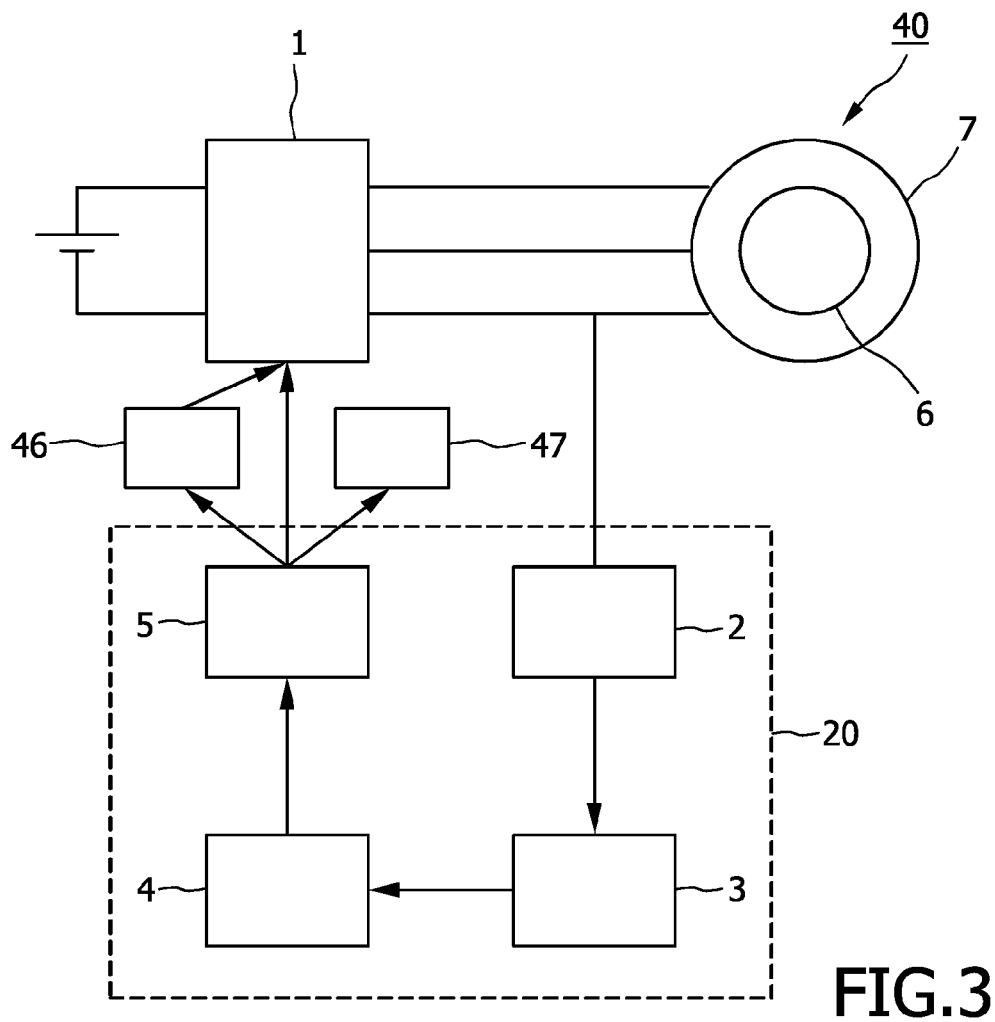
Figure 4:
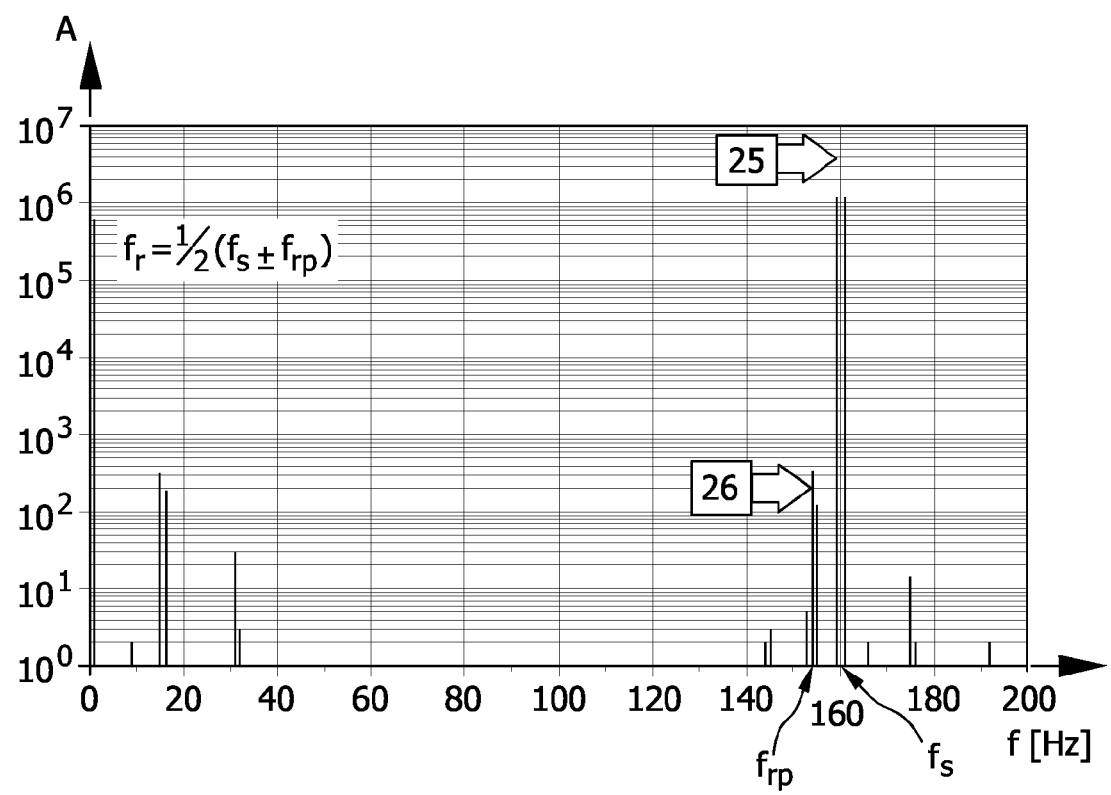
Figure 5:
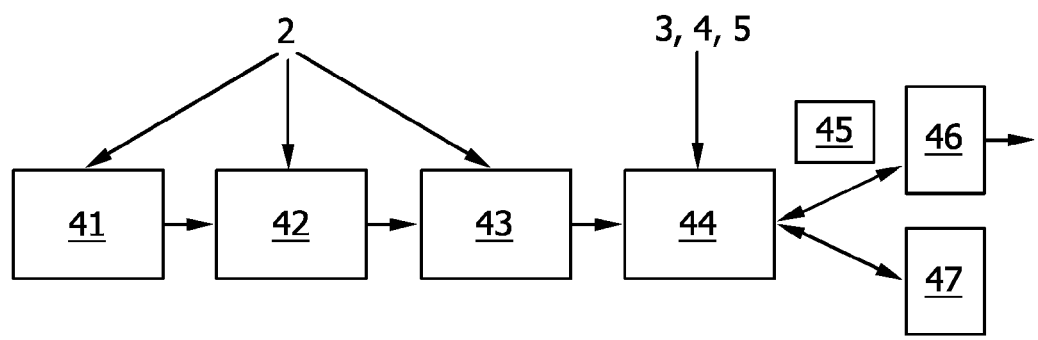

The objects, features and advantages of the invention will be apparent from the following, more specific description of embodiments of the invention as illustrated in the accompanying drawings, wherein:

FIG. 1 shows the generation of X-rays in an X-ray tube with a rotary anode driven by an asynchronous machine, FIG. 2 shows symmetric boreholes within the copper cylinder of the rotor, FIG. 3 is a schematic diagram of the asynchronous machine according to the invention, FIG. 4 shows a stator current spectrum showing well-defined rotor and stator peaks, and FIG. 5 shows a schematic diagram of the measurement method.

FIG. 1 shows an X-ray tube 30 with a rotary anode 16 driven by an asynchronous machine 40 as an example of the usage of the asynchronous machine 40 of the present invention. An X-ray tube 30 consists of a cathode 18 and a rotary anode 16 within the vacuum 15 of an envelope 17. Electrons are accelerated from the cathode 18 to the rotary anode 16 and collide with the rotary anode 16 as the metal target. By colliding with the metal target X-ray photons 19 are emitted from the rotary anode 16. To avoid a focal spot of the colliding electrons on the rotary anode 16 the rotary anode 16 is a rotatable plate connected to a shaft of a rotor 6 of an asynchronous machine 40. By using a rotary anode 16 the focal spot is averaged along the edge of the plate, which results in long durableness of the rotary anode 16 and allows a high energy electron beam.

The envelope 17 is enclosed in a housing 11, which is filled with oil 14 cooling the X-ray tube 30 and which comprises the stator 7 of the asynchronous machine 40. The stator 7 is connected to an electrical supply 1. The three-phase stator current causes a rotating electromagnetic field, which leads to the rotation of the rotor 6 and thus the rotary anode 16. Using the asynchronous machine 40 of the present invention at least one phase of the stator current is measured. The measured current signal is processed in the device 20 and the mechanical rotor frequency and thus the rotary anode velocity is calculated. Thus, the operation of the X-ray tube 30 can be optimized.

FIG. 2 shows an asymmetry in the rotor 6 realized by two boreholes 21 within the copper shell 22 in diametrical opposition. The relative area of the eliminated copper constitutes 0.5 to 5%, in particular 1% to 3.5%, of the whole rotor shell 22. Less than 0.5% asymmetry leads to such a small signal-to-noise-ratio that no mechanical rotor frequency is detectable. More than 5% asymmetry causes a significant negative influence on the efficiency.

Different ways to achieve the asymmetry like the variation of the copper thickness or implementing an electrically different material are also applicable.

FIG. 3 schematically shows an asynchronous machine 40 according to the invention having a rotor 6, which has a fixed number of pairs of poles and a predetermined defect, and a stator 7. Further, the asynchronous machine 40 comprises a device 20 according to the invention for measuring the stator current and for calculating the mechanical rotor frequency. The three phase electrical supply 1 applied to the three phases of the stator creates a rotating electromagnetic field in the air gap of the stator 7. The rotating electromagnetic field induces a current to flow in the rotor 6 and creates a torque. The rotor 6 accelerates in response to this torque until a finally achievable velocity (below the synchronous velocity) is reached. The resulting field in the air gap is the sum of the rotary field of the stator and the rotary field of the rotor.

The asynchronous machine 40 according to the invention comprises a current determination unit 2 for measuring a stator current of the stator 7 in at least one phase, wherein the stator current has a stator frequency. The measured stator current is processed in a processing unit 3, which forms a stator current spectrum of the measured stator current. The processing unit 3 comprises preferably a FFT unit. An analyzing unit 4 analyzes the stator current spectrum and determines an inverse peak 26 and a corresponding inverse frequency in the stator current spectrum. The inverse frequency is used to calculate the mechanical rotor frequency in a calculation unit 5. The information of the mechanical rotor frequency is then preferably output to a display 47 or a PC 46, which can be connected to the electrical supply 1 to control the stator current, for further functions like controlling the mechanical rotor frequency to a constant value or to increase or to decrease the mechanical rotor frequency. In a preferred embodiment of the invention a control unit is coupled to the electrical supply 1 and to the calculation unit 5 to control the stator current and the mechanical rotor frequency.

FIG. 4 shows a stator current spectrum, wherein the frequency f in Hz is plotted on the x-axis with signal bars with 1 Hz resolution and the amplitude A in arbitrary units is plotted on the y-axis. By setting the stator frequency $f_s$ to $f_s = n \cdot f_{FFT}$, n∈N ($f_{FFT}$=fundamental frequency of the FFT) the leak effect in the FFT unit is reduced and well-separated sharp peaks are obtained.

Furthermore, the stator peak 25, which is the highest peak in the stator current spectrum, and the inverse peak 26, which is the second highest peak within the stator frequency range in the stator current spectrum, are detected. The inverse peak 26 can be easily identified because the inverse frequency $f_{rp}$ is in the frequency range of the stator frequency $f_s$. In the example of FIG. 4 the asynchronous machine has one pair of poles. In this case p is equal to 1, which means that the rotary frequency of the rotating electromagnetic field is equal to the stator frequency $f_s$. In the stator current spectrum shown in FIG. 4 the frequency range of the stator frequency $f_s$, which is approximately 160 Hz, includes all frequencies being lower than the stator frequency $f_s$. Preferably, the range is limited to all frequencies higher than the (known) sweep frequency of the asynchronous machine. In the present example the frequency range could also be limited to a range from 80 to 160 Hz (or to any other predetermined lower frequency limit).

If the slip s is increasing from 0% to 50%, the inverse frequency $f_{rp}$ is decreasing from $f_s/p$ to 0 Hz. If the slip s is further increasing from 50% to 100%, the inverse frequency $f_{rp}$ is increasing from 0 Hz to $f_s/p$. The inverse frequency $f_{rp}$ can be estimated from FIG. 4 to be approximately 155 Hz, which is within the frequency range of the stator frequency $f_s$.

Both peaks are analyzed and judged, if the peak amplitudes, the peak frequencies and the peak width are within specified ranges. For instance, the calculation unit 5 applies the center of gravity method to calculate the frequency position of the peaks, which leads to an accuracy of $\Delta f=0.1$ Hz in the mechanical rotor frequency $f_r$.

The calculation unit 5 calculates the mechanical rotor frequency $f_r$ from the frequencies of these both peaks according to $$f_r = \frac{1}{2}\left(\frac{f_s}{p} \pm f_{rp}\right).$$

In the case shown in FIG. 4 the number of pairs of poles p is equal to one, which means that the mechanical rotor frequency $f_r$ of the rotor 6 is calculated from the sum of the stator frequency $f_s$ (strictly speaking divided by p which is equal to 1 in this example), and the inverse frequency $f_{rp}$, if the slip of said asynchronous machine 40 is lower than 50%. If the slip is higher than 50%, the mechanical rotor frequency $f_r$ is calculated from the difference of the stator frequency $f_s$ and the inverse frequency $f_{rp}$. Preferably, the calculation unit 5 divides the sum or the difference by two to obtain an optimal and precise value.

For applying the equation $$f_r = \frac{1}{2}\left(\frac{f_s}{p} \pm f_{rp}\right)$$

for calculating the mechanical rotor frequency $f_r$ the stator current corresponding to a slip of 50% has to be known. This stator current is preferably determined by measurements before starting the asynchronous machine. If the stator current corresponding to a slip of 50% has been determined, the asynchronous machine is started and the stator current is measured during the operational mode of the asynchronous machine. Having the information of the present current and stator current corresponding to a slip of 50% the calculation of the mechanical rotor frequency $f_r$ can be easily carried out according to the equation as stated above. The slip s of any asynchronous machine is defined by $$s = \frac{\left(\frac{f_s}{p} - f_r\right)}{f_s}.$$

FIG. 5 shows the processing of the stator current signal. A current transformator 41 is used for a galvanic isolation of the stator current.

The signal is filtered by a low-pass filter 42 to avoid aliasing effects and amplified by an amplifier 43 to get a fitted signal to a microcontroller 44. The current transformator 41, low-pass filter 42 and amplifier are preferably included in the current determination unit 2. After the processing within the microcontroller 44, which carries out the steps of forming a stator current spectrum, analyzing the stator current spectrum and determining an inverse peak 26 and a corresponding inverse frequency and calculating the mechanical rotor frequency, the mechanical rotor frequency is displayed on a display 47 or transmitted, e.g. via a RS 232 serial binary data interconnection 45, to a PC 46.

Within the microcontroller 44 an A/D-conversion and subsequently a fast Fourier transformation (FFT) is carried out. The current spectrum is then analyzed to detect the peak of the inverse frequency and to validate the inverse frequency. In a next step of signal processing within the microcontroller 44 the mechanical rotor frequency is calculated and finally output.

The present invention is applicable in all systems having an asynchronous machine, if the determination of the mechanical rotor frequency cannot be realized mechanically or optically.

High-end CT systems need the highest realizable peak power in the focal spot of X-ray tubes. Therefore it is necessary to run the tube rotor with maximum rotation frequency. The rotation systems of high power CT tubes are designed with spiral groove bearings, which generate significant friction losses during high-frequency operation (>180 Hz). Future CT tubes need to include an intelligent rotary frequency management to optimize necessary frequency and lowest possible friction losses. The invention allows realizing and controlling different mechanical rotor frequencies during CT applications.

The invention claimed is:

1. Asynchronous machine (40) including a rotor (6) and a stator (7) and having a fixed number of pairs of poles, said rotor (6) having a predetermined defect, said asynchronous machine (40) comprising
a current determination unit (2) for determining a stator current of said stator (7), said stator current having a stator frequency,
a processing unit (3) for forming a stator current spectrum of said stator current,
an analyzing unit (4) for analyzing said stator current spectrum and determining an inverse peak (26) and a corresponding inverse frequency in said stator current spectrum, said inverse peak (26) being the peak having the second highest amplitude in said stator current spectrum in the frequency range of said stator frequency, and
a calculation unit (5) for calculating a mechanical rotor frequency of said rotor (6) from the sum of said stator frequency divided by the number of pairs of poles and said inverse frequency, if the slip of said asynchronous machine (40) is lower than 50%, or from the difference of said stator frequency divided by the number of pairs of poles and said inverse frequency, if said slip is higher than 50%.

2. Asynchronous machine (40) according to claim 1, characterized in that said calculation unit (5) is adapted for dividing said sum, if the slip of said asynchronous machine (40) is lower than 50%, or said difference, if said slip is higher than 50%, by two.

3. Asynchronous machine (40) according to claim 1, characterized in that said current determination unit (2) is adapted for measuring said stator current of said stator (7).

4. Asynchronous machine (40) according to claim 1, characterized in that said asynchronous machine (40) further comprises a control unit for controlling said stator current of said stator (7).

5. Asynchronous machine (40) according to claim 1, characterized in that said analyzing unit (4) is adapted for determining a stator peak (25) and a corresponding stator frequency in said stator current spectrum, said stator peak (25) being the peak having the highest amplitude in said stator current spectrum and said stator frequency being higher than said inverse frequency.

6. Asynchronous machine (40) according to claim 1, characterized in that said analyzing unit (4) is adapted for determining, if the amplitude, the frequency and/or the width of peaks in said stator current spectrum are within specified ranges.

7. Asynchronous machine (40) according to claim 1, characterized in that said frequency range of said stator frequency includes all frequencies being lower than said stator frequency divided by the number of pairs of poles.

8. Asynchronous machine (40) according to claim 1, characterized in that said rotor (6) is a massive rotor, which is a full or hole iron made cylinder.

9. Asynchronous machine (40) according to claim 1, characterized in that said predetermined defect is a hole or a pair of oppositely arranged holes (21) in said rotor (6).

10. Asynchronous machine (40) according to claim 1, characterized in that said predetermined defect constitutes 0.5% to 5%, in particular 1% to 3.5%, of the shell (22) of said rotor (6).

11. Asynchronous machine (40) according to claim 1, characterized in that said predetermined defect is an inhomogeneity in said rotor (6), in particular a variation of the thickness of the shell (22) of said rotor (6) or of the material of said rotor (6).

12. X-ray tube (30) having an asynchronous machine (40) according to claim 1 for driving a rotary anode (16), said rotary anode (16) being coupled to said rotor (6).

13. Device (20) for determining a mechanical rotor frequency of a rotor (6) of an asynchronous machine (40), said asynchronous machine (40) having a stator (7) and a fixed number of pairs of poles, said rotor (6) having a predetermined defect, said device (20) comprising
a current determination unit (2) for determining a stator current of said stator (7), said stator current having a stator frequency,
a processing unit (3) for forming a stator current spectrum of said stator current,
an analyzing unit (4) for analyzing said stator current spectrum and determining an inverse peak (26) and a corresponding inverse frequency in said stator current spectrum, said inverse peak (26) being the peak having the second highest amplitude in said stator current spectrum in the frequency range of said stator frequency, and
a calculation unit (5) for calculating said mechanical rotor frequency of said rotor (6) from the sum of said stator frequency divided by the number of pairs of poles and said inverse frequency, if the slip of said asynchronous machine (40) is lower than 50%, or from the difference of said stator frequency divided by the number of pairs of poles and said inverse frequency, if said slip is higher than 50%.

14. Method for determining a mechanical rotor frequency of a rotor (6) of an asynchronous machine (40), said asynchronous machine (40) having a stator (7) and a fixed number of pair of poles, said rotor (6) having a predetermined defect, said method comprising the steps of determining a stator current of said stator (7), said stator current having a stator frequency, forming a stator current spectrum of said stator current, analyzing said stator current spectrum and determining an inverse peak (26) and a corresponding inverse frequency in said stator current spectrum, said inverse peak (26) being the peak having the second highest amplitude in said stator current spectrum in the frequency range of said stator frequency, and calculating said mechanical rotor frequency of said rotor (6) from the sum of said stator frequency divided by the number of pairs of poles and said inverse frequency, if the slip of said asynchronous machine (40) is lower than 50%, or from the difference of said stator frequency divided by the number of pairs of poles and said inverse frequency, if said slip is higher than 50%.

\* \* \* \* \*